(12) United States Patent
Legatski (10) Patent No.: US 12,425,259 B2
(45) Date of Patent: *Sep. 23, 2025

(54) ASSIGNING DISPLAY LOCATIONS FOR A SERIES OF VIDEO CONFERENCES

(71) Applicant: Zoom Communications, Inc., San Jose, CA (US)

(72) Inventor: Richard Dean Legatski, Castle Rock, CO (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/756,728

(22) Filed: Jun. 27, 2024

(65) Prior Publication Data

US 2024/0348466 A1  Oct. 17, 2024

Related U.S. Application Data

(63) Continuation of application No. 18/124,853, filed on Mar. 22, 2023, now Pat. No. 12,101,198.

(51) Int. Cl.
*H04L 12/18* (2006.01)

(52) U.S. Cl.
CPC ...... *H04L 12/1822* (2013.01); *H04L 12/1831* (2013.01)

(58) Field of Classification Search
CPC .................. H04L 12/1822; H04L 12/1831
See application file for complete search history.

(56) References Cited

U.S. PATENT DOCUMENTS

| | | |
|---|---|---|
| 8,760,485 B2 | 6/2014 | Dunn et al. |
| 2011/0270923 A1 | 11/2011 | Jones et al. |
| 2012/0079399 A1 | 3/2012 | Ferman et al. |
| 2012/0206561 A1 | 8/2012 | Huang |
| 2015/0256795 A1 | 9/2015 | Chauhan |
| 2020/0219216 A1 | 7/2020 | Davis et al. |
| 2022/0182253 A1 | 6/2022 | Pawar et al. |
| 2022/0374136 A1 | 11/2022 | Chang et al. |
| 2022/0374844 A1* | 11/2022 | Johnston ............ G06Q 10/1095 |
| 2024/0064271 A1* | 2/2024 | Murata .................. H04N 7/152 |

* cited by examiner

*Primary Examiner* — Raqiul A Choudhury (74) *Attorney, Agent, or Firm* — Young Basile Hanlon & MacFarlane, P.C.

(57) ABSTRACT

Methods, systems, and apparatus, including computer programs encoded on computer storage media related to display configuration for a communications session. The system assigns a display location for each of multiple meeting participants. A meeting participant is associated with an unique identifier of the meeting participant. A user interface configured to display meeting participants at display locations is displayed. After a particular meeting participant has joined a first video conferencing session, the user interface display the particular meeting participant at their assigned display location.

20 Claims, 8 Drawing Sheets

| Position | Student ID | Name | Called Upon | Status | Days Missed | Team |
|---|---|---|---|---|---|---|
| 221 | 12345 | First & Last Name | Yes | Current | 0 | A |
| 222 | 12346 | First & Last Name | No | Current | 0 | C |
| 223 | 12347 | First & Last Name | No | Current | 3 | C |
| 224 | 12348 | First & Last Name | No | Current | 0 | A |
| 225 | 12349 | First & Last Name | Yes | Current | 0 | E |
| 226 | 12350 | First & Last Name | No | Withdrew | 0 | None |
| 227 | 12351 | First & Last Name | No | Current | 0 | E |
| 228 | 12352 | First & Last Name | No | Current | 0 | A |
| 229 | 12353 | First & Last Name | No | Current | 2 | C |
| 230 | 12354 | First & Last Name | No | Current | 0 | B |
| 231 | 12355 | First & Last Name | No | Current | 0 | D |
| 232 | 12356 | First & Last Name | No | Current | 1 | D |
| 233 | 12357 | First & Last Name | Yes | Current | 0 | B |
| 234 | 12358 | First & Last Name | No | Current | 0 | D |
| 235 | 12359 | First & Last Name | No | Current | 0 | E |
| 236 | Unassigned | Unassigned | Unassigned | Unassigned | Unassigned | Unassigned |
| 237 | Unassigned | Unassigned | Unassigned | Unassigned | Unassigned | Unassigned |
| 238 | Unassigned | Unassigned | Unassigned | Unassigned | Unassigned | Unassigned |
| 239 | Unassigned | Unassigned | Unassigned | Unassigned | Unassigned | Unassigned |

ASSIGNING DISPLAY LOCATIONS FOR A SERIES OF VIDEO CONFERENCES

CROSS-REFERENCE TO RELATED APPLICATIONS

This application is a continuation of U.S. patent application Ser. No. 18/124,853, filed Mar. 22, 2023, the entire disclosure of which is hereby incorporated by reference.

FIELD

This application relates generally to video-based communications, and more particularly, to systems and methods for attendee management of repetitive video communication sessions for a group of users.

SUMMARY

The appended claims may serve as a summary of this application.

DETAILED DESCRIPTION OF THE DRAWINGS

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Figure 1A:
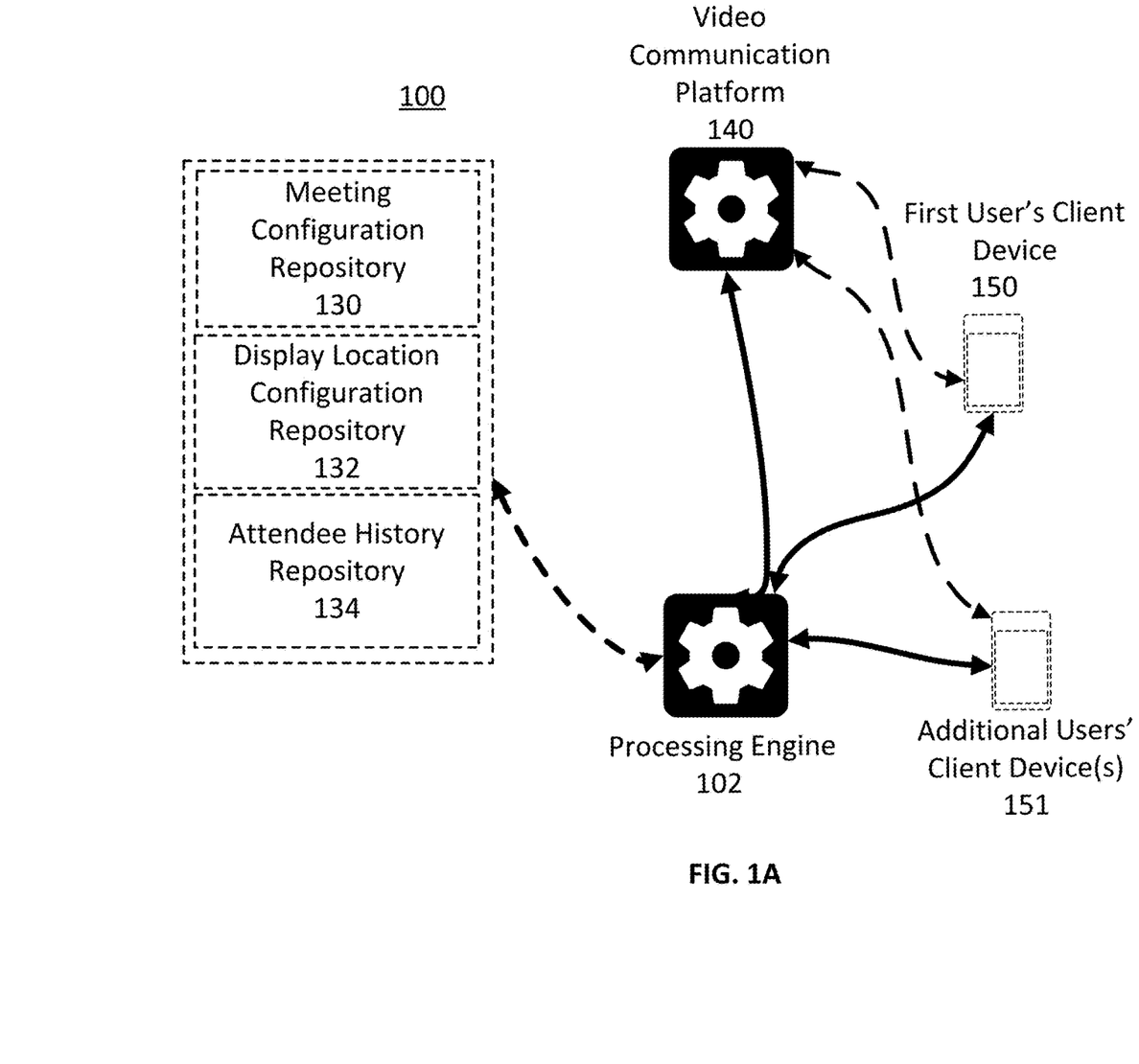
FIG. 1A is a diagram illustrating an exemplary environment in which some embodiments may operate.

FIG. 1A is a diagram illustrating an exemplary environment in which some embodiments may operate. In the exemplary environment 100, a first user's client device 150 and one or more additional users' client device(s) 151 are connected to a processing engine 102 and, optionally, a video communication platform 140. The processing engine 102 is connected to the video communication platform 140, and optionally connected to one or more repositories (e.g., non-transitory data storage) and/or databases, including a Meeting Configuration Repository 130, Display Location Configuration Repository 132 and an Attendee History Repository 134. The Meeting Configuration Repository 130 may include information (such as title, topic, date and time and a list of attendees) about a planned meetings with meeting participants that are planned to attend a meeting. The Display Location Configuration Repository 132 may include display locations assigned for a group of meeting participants. The display locations may be associated with a repeating meeting (such as an online course). The Attendee History Repository 134 may include historical information about which of the meeting participants attended a particular planned meeting.

The first user's client device 150 and additional users' client device(s) 151 in this environment may be computers, and the video communication platform 140 and processing engine 102 may be applications or software hosted on a computer or multiple computers which are communicatively coupled via remote server or locally.

The exemplary environment 100 is illustrated with only one additional user's client device, one processing engine, and one video communication platform, though in practice there may be more or fewer additional users' client devices, processing engines, and/or video communication platforms. In some embodiments, one or more of the first user's client device, additional users' client devices, processing engine, and/or video communication platform may be part of the same computer or device.

In an embodiment, processing engine 102 may perform the methods 500, 600 or other methods described herein and, as a result, provide for attendee management of repetitive video communication sessions for a group of users. In some embodiments, this may be accomplished via communication with the first user's client device 150, additional users' client device(s) 151, processing engine 102, video communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

In some embodiments, the first user's client device 150 and additional users' client devices 151 may perform the methods 500, 600 or other methods described herein and, as a result, provide for attendee management of repetitive video communication sessions for a group of users. In some embodiments, this may be accomplished via communication with the first user's client device 150, additional users' client device(s) 151, processing engine 102, video communication platform 140, and/or other device(s) over a network between the device(s) and an application server or some other network server.

The first user's client device 150 and additional users' client device(s) 151 may be devices with a display configured to present information to a user of the device. In some embodiments, the first user's client device 150 and additional users' client device(s) 151 present information in the form of a user interface (UI) with UI elements or components. In some embodiments, the first user's client device 150 and additional users' client device(s) 151 send and receive signals and/or information to the processing engine 102 and/or video communication platform 140. The first user's client device 150 may be configured to perform functions related to presenting and playing back video, audio, documents, annotations, and other materials within a video presentation (e.g., a virtual class, lecture, video conference, webinar, or any other suitable video presentation) on a video communication platform. The additional users' client device(s) 151 may be configured to view the video presentation, and in some cases, presenting material and/or video as well. In some embodiments, first user's client device 150 and/or additional users' client device(s) 151 include an embedded or connected camera which is capable of generating and transmitting video content in real time or substantially real time. For example, one or more of the client devices may be smartphones with built-in cameras, and the smartphone operating software or applications may provide the ability to broadcast live streams based on the video generated by the built-in cameras. In some embodiments, the first user's client device 150 and additional users' client device(s) 151 are computing devices capable of hosting and executing one or more applications or other programs capable of sending and/or receiving information. In some embodiments, the first user's client device 150 and/or additional users' client device(s) 151 may be a computer desktop or laptop, mobile phone, video phone, conferencing system, or any other suitable computing device capable of sending and receiving information. In some embodiments, the processing engine 102 and/or video communication platform 140 may be hosted in whole or in part as an application or web service executed on the first user's client device 150 and/or additional users' client device(s) 151. In some embodiments, one or more of the video communication platform 140, processing engine 102, and first user's client device 150 or additional users' client devices 151 may be the same device. In some embodiments, the first user's client device 150 is associated with a first user account on the video communication platform, and the additional users' client device(s) 151 are associated with additional user account(s) on the video communication platform.

Video communication platform 140 comprises a platform configured to facilitate video presentations and/or communication between two or more parties, such as within a video conference or virtual classroom. In some embodiments, video communication platform 140 enables video conference sessions between one or more users.

Figure 1B:
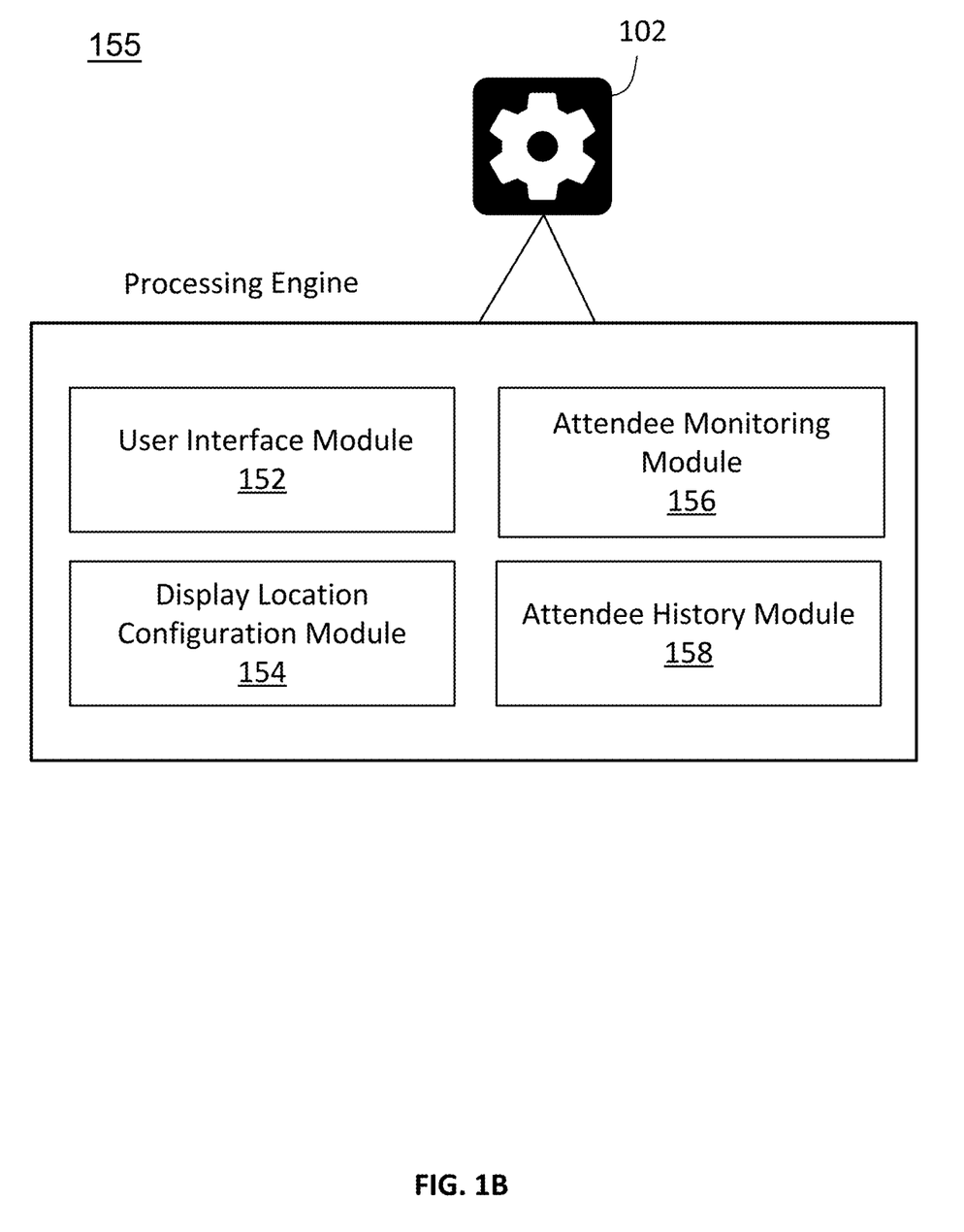
FIG. 1B is a diagram illustrating an exemplary computer system with software and/or hardware modules that may execute some of the functionality described herein.

FIG. 1B is a diagram illustrating an exemplary computer system 155 with software and/or hardware modules that may execute some of the functionality described herein. Computer system 155 may comprise, for example, a server or client device or a combination of server and client devices for multi-stream video communication among users attending a communications session.

The User Interface Module 152 provides system functionality for presenting a user interface to one or more users of the video communication platform 140 and receiving and processing user input from the users. User inputs received by the user interface herein may include clicks, keyboard inputs, touch inputs, taps, swipes, gestures, voice commands, activation of interface controls, and other user inputs. In some embodiments, the User Interface Module 152 presents a visual user interface on a display screen. In some embodiments, the user interface may comprise audio user interfaces such as sound-based interfaces and voice commands.

The Display Location Configuration Module 154 provides system functionality configuring and assigning a user to a designated space or location for display in the meeting. This module allows a primary user to configure and assign meeting participants to a display location. The module allows provides for the automatic assignment of meeting participants to display locations.

The Attendee Monitoring Modules 156 provides system functionality for monitoring the attendance of users of multiple meetings that are held over a course of a period of time. This module monitors and records to storage when a meeting participant has joined or has left before the end of a planned online meeting.

The Attendee History Module 158 provides system functionality for the reporting and analysis of users' attendance record and/or behavior to the multiple meetings. This module evaluates meeting participant attendance history and may provide reports about the attendance of the meeting participants.

The Presentation Display Module 160 provides system functionality for displaying or presenting multi-media presentation and/or screen sharing content that has video and/or animated graphics shared among the meeting participants. The Presentation Display Module 160 controls aspects presenting information to attendees of a video-based meeting.

Figure 2:
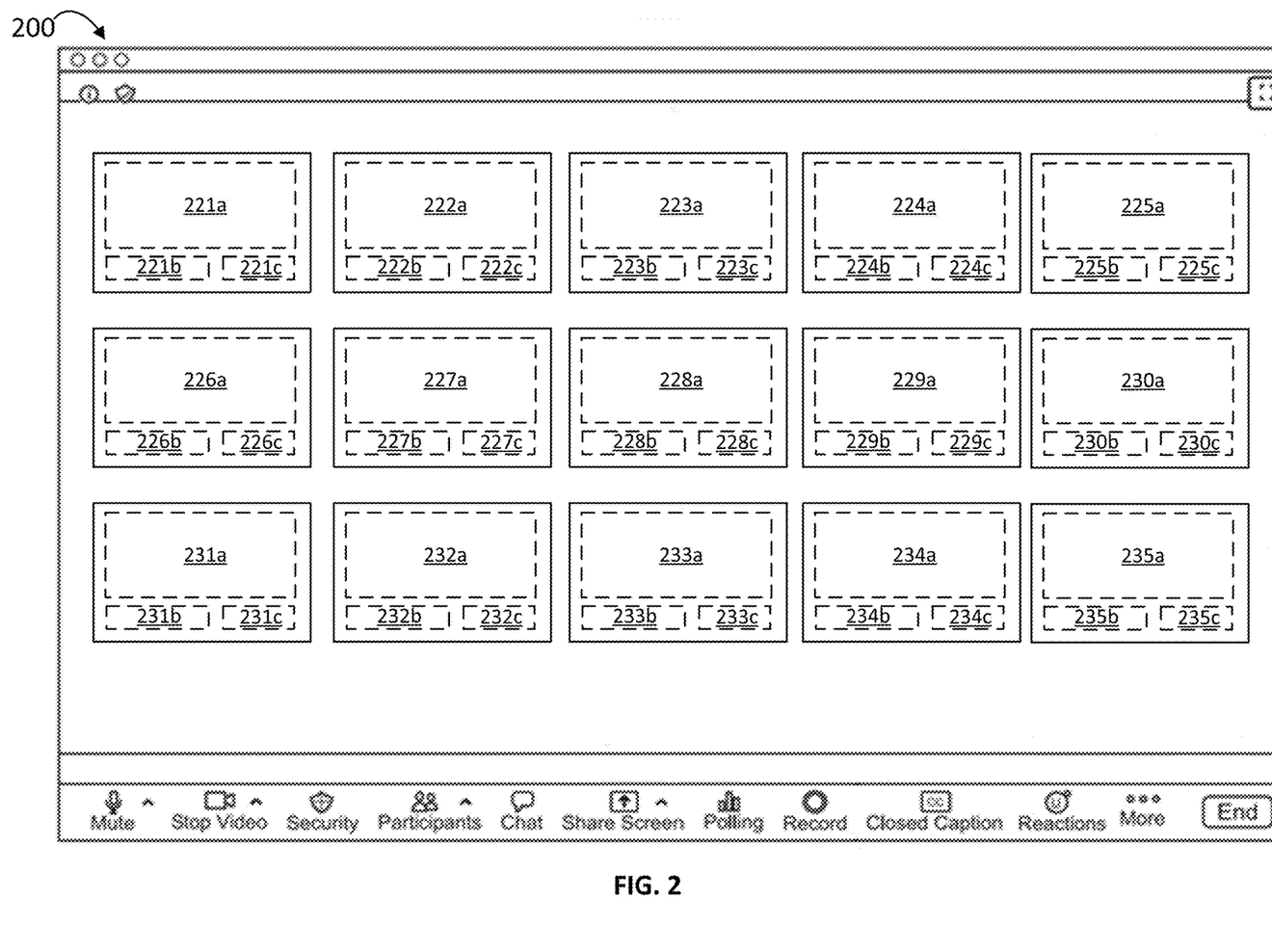
FIG. 2 is a diagram illustrating an exemplary user interface used in some embodiments.

FIG. 2 is a diagram illustrating an exemplary user interface 200 used in some embodiments. The system, via the User Interface Module 152, may generate and display the user interface 200. In some embodiments, the system provides functionality allowing a primary or administrative user to organize the placement of attendees in a display grid or other fixed positions within a display area. The user interface may be used by an instructor teaching an online course. In the context of repetitive meetings (such as an online class) where the same group of attendees (e.g., student attendees) meet over a course of a period of time, fixing the placement of attendees in a display is especially useful for not only the instructor of an online class, but also helpful the student attendees. An instructor develops familiarity with a location of where a particular student is placed within the display. Over the course of multiple meetings, the instructor may easily identify whether a student is absent or in attendance by simply observing whether the fixed location shows activity of the student's attendance. When a student logs into the meeting, the user interface may display in user interface 200 some indication that the user is attendance (such as displaying a video stream of the user and/or some graphical indication using an icon). The system may display a color-coded box or other graphical indication to note whether the student has not joined the meeting. For example, the system may display in the user interface 200 that a yellow box in the display location of any student that has not joined the meeting. Also, the system may display in the user interface 200 in association with a display in an icon or other graphical information noting that a particular meeting attendee is late to the online meeting, and the amount of time that the meeting attendee is late to the meeting (such as 5 minutes, 10 minutes, etc.).

In some embodiments, users may be preassigned to a particular space or location for display and the user interface 200 displays information in a preassigned area for the specific user. For example, the user interface may have boundaries or areas that are associated with a particular user. Display locations 221*a*, 222*a*, 223*a*, etc. may be associated with a particular user or attendee. The user interface 200 may display in the respective assigned display location (e.g., 221*a*, 223*a*, etc.) a video stream, image, avatar or other information of the assigned user indicating their attendance of the meeting. For example, in the context of a video-based classroom, as students begin to join the meeting, information about their attendance will be displayed at the pre-assigned location. An instructor may quickly note which students are in attendance by noting this information the students that have joined the meeting.

In some embodiments, the system may determine track for a meeting or a series of meetings how interactive a student has been. The system may track the number of times the student has provided audio or written comments during a meeting. The system may then provide an indication via the user interface 200 to identify the level of involvement of student. For example, an icon with a color scale or a numeric value may be presented via the display area 221*c*, 222*c*, 223*c* for the respective students. The instructor then may be able to call upon those students that have been less interactive during the meeting.

In some embodiments, a user may select multiple display locations and assign those display locations to a group or team. For example, the user interface 200 may receive a selection such as a click on multiple display locations. Each of the selected display locations may be assigned to a particular team or group, such as team A, B, C, D etc. During the course of an online meeting, the instructor may desire that each of the teams meet as a break-out group. The break-out group would include each of the users assigned to a respective team. For example, referring to FIG. 3, students 12345, 12348, 12352 are assigned to Team A. The user interface 200 may receive an input to cause one or more of the assigned teams to be placed in another mode where only each of the team members in a group may communicate to one another. Also, in this mode, the instructor user may also communicate with a respective team. The user interface 200 may receive an input to cause the respective students to be placed back into a classroom mode which is discussed further below with regard to FIG. 4.

In some embodiments, the system may automatically determine a team composition, and assign respective students to a team. The user interface 200 may receive an input to cause the system to generate a new team matrix for the student meeting participants. Also, the system may be configured to periodically (such as every class or meeting, or every nth meeting) generate a new team matrix for the student meeting participants. For example, the system may record and store the team assignments. The system evaluates a student's previous team assignments and generates a new team assignment with other students where they have not been assigned to a team with the other students. This functionality provides reorganizing of student teams so that students may interact with different students over the course of the online classes.

The preassigned areas of the user interface may also display other information associated with the user assigned to the location. For example, areas 221*b*, 222*b*, 223*b*, etc. may display the name of the user. During a meeting, the display of this information allows the instructor to easily call upon the student by their name.

Other information may be displayed in other areas in association with the user. For example, areas 221*c*, 222*c*, 223*c*, etc. may display information that is helpful to the instructor. Information such as the number of prior meetings missed may be displayed, the number of times that the instructor called upon the student, and/or the current grade point average of the student in the class. While this information is displayed in an instructor or admin view, a student view as described with regard to FIG. 4 would not include this information.

Figure 4:
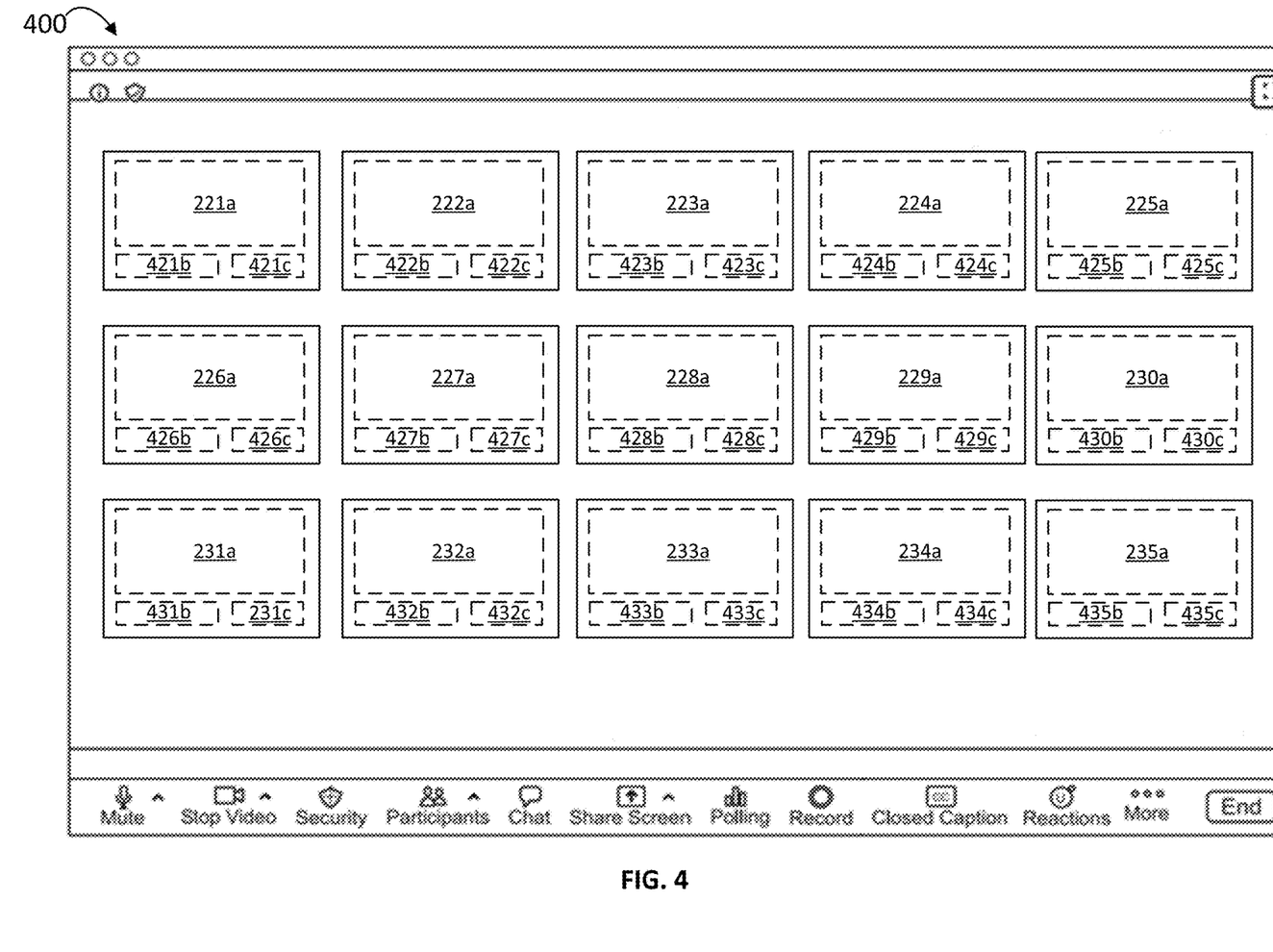
FIG. 4 is a diagram illustrating an exemplary user interface used in some embodiments.

In some embodiments, the system, via the Display Location Configuration Module 154, provides functionality allowing a user (such as admin or instructor) to reconfigure the display arrangement of previously assigned display locations. For example, the user interface 400 may receive a mouse or touch input on or about a display location. A bounding box indicating the display location may be dragged and dropped between other display locations. Moving a display location to another area reorganizes the assigned user display location to the new display position. For example, if display location 224*a* is moved between display locations 227*a* and 228*a*, then each of display locations 225*a*, 226*a* and 227*a* would be moved one location to the left. Display location 224*a* would be moved to the previous display location of 227*a*. This rearrangement causes the display locations assigned to users to be moved or shifted to a new display location. Similarly, a display location may be deleted. For example, display location 223*a* may be deleted or removed. This causes the display locations 224*a*, 225*a*, 225*a*, etc. to move one display location position to the left. Reconfiguration of the user display location is especially useful in the situation where students of an online course have dropped the course or are no longer attending. Instead of having a display location with a non-active student, the students may be regrouped together to remove the student that is no longer attending the online course.

While a display location has been referred to in the context of user interface 400 as a preset bounding box organized in a grid layout, a display location may also be a location (such as an x, y location coordinate) in a display area. A display location is a location in a display area of where a meeting participant information (such as a video stream of the meeting participant, and other information associated with the meeting participant) may be displayed in the user interface 400. Also, in some embodiments the system provides for free-form placement at any location within a display area. In other words, the layout of the meeting participants is not restricted to a grid layout. A user providing organization inputs to the user interface 400 may move the display locations in a free form arrangement in the display. The system will store the locations in the display where the display locations have been arranged.

Figure 3:
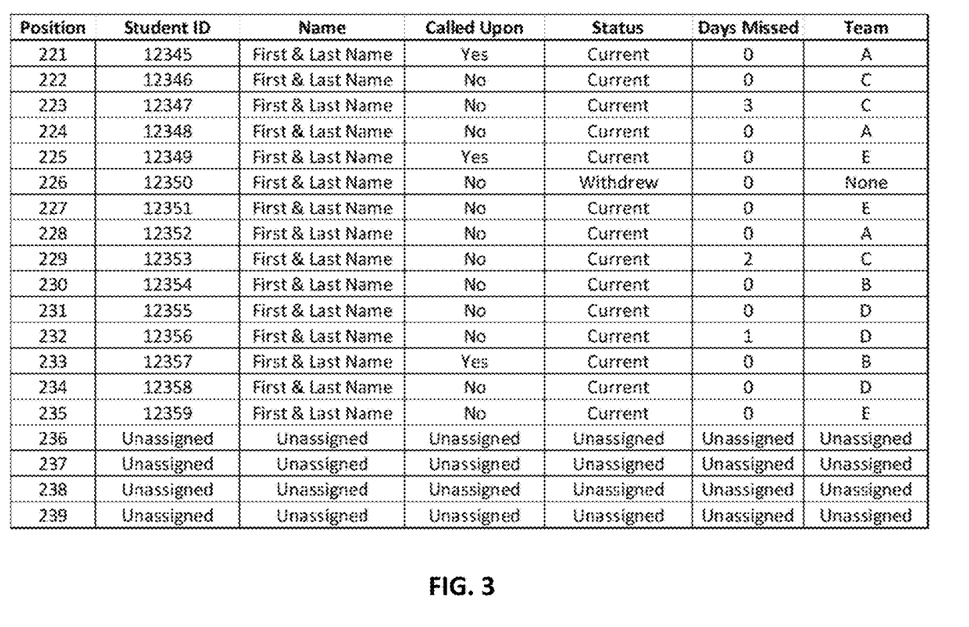
FIG. 3 is a diagram illustrating an electronic database of attendee information.

Referring now to FIG. 3, is a diagram illustrating an electronic database of attendee information. In some embodiments, user (e.g., student) information may be associated with a particular display position or location. For example, the table of FIG. 3, indicates a display position (such as 221, 222, 233) associated with a student identifier. While the position is associated with a student identifier, the position may be associated with other unique identifiers, such as an email address. The system, via the Display Location Configuration Module 154, may automatically configure respective display position (i.e., 221, 222, 233, by applying the listing that associates a user or student identifier to a respective display position.

In some embodiments, the system may present a user interface where a user or student identifier information may be input into or about the display position. The system would record the assigned display location. For example, a student identifier, student name and/or email address may be input into or about the display location.

In some embodiments, the system may automatically assign a user to a display location based on the alphabetical order of the listing of the meeting attendees. For example, a first scheduled meeting may include a listing of the attendees of the meeting (such as in a calendaring system). The system may evaluate the listing and automatically assign each of the attendees to a display location. The automatic assignment may be based on the alphabetical listing of the attendees' email address, attendee name In some embodiments, the system may automatically assign a user joining the meeting to the next available display location. For example, for a first meeting of a series of meetings, as users join the first meeting they are assigned to a consecutive display location in the order that the user joined the meeting. Then during subsequent meetings, the users will be displayed at the same display location as the first meeting. For any new meeting attendees of later meetings (e.g., the second, third, fourth meeting, etc.), they would be assigned to the next unused display location.

The electronic database of attendee information may also include status information and/or meeting attendance information of the users. For example, the system, via the Attendee History Module 158, may record and keep track of a user's attendance or non-attendance of a meeting. For a respective attendee (e.g., user or student), the system may display the attendance information via the user interface 200 (e.g., instructor display) in a display area (such as 221c, 222c, 223c, etc.). The system may identify the number of days of prior meetings that a particular student missed. This may provide actionable information to the instructor so that the instructor may identify those students at risk of failing the course for which the students are participating in online learning.

Referring now to FIG. 4, is a diagram illustrating an exemplary user interface 400 used in some embodiments. The system, via the User Interface Module 152, displays this user interface to the students or the meeting participants of an online meeting. This user interface lacks the controls or functionality to configure or assign the meeting participants to a display location. User interface 400 is similarly displayed to the multiple meeting participants (e.g., the students). In some embodiments, the user interface includes a display of a meeting participant in their assigned location. In other embodiments, the meeting participant is not displayed via the user interface depicted via their client device. Similar to the user interface 200 (which may be referred to as the instructor view), the user interface 400 (which may be referred to as the student view), places the respective meeting participants in their assigned display location. Displaying the respective meeting participants in their assigned display locations provides a real-world experience for students of having the same classmate sits next to them. In other words, for each online class, the same students should be positioned next to them. For example, the student assigned to display location 227a then should see the same video, image or avatars of the students assigned to display locations 22a, 226a, 228a and 232a.

In some embodiments, information associated with a student may be displayed about their display location. For example, the user interface 400 in the areas 421b, 422b, 423b, etc. may display a name of the student. The user interface 400 in the areas 421c, 422c, 423c, etc. may display other information, such as the team or group that a student has been assigned to.

Figure 5:
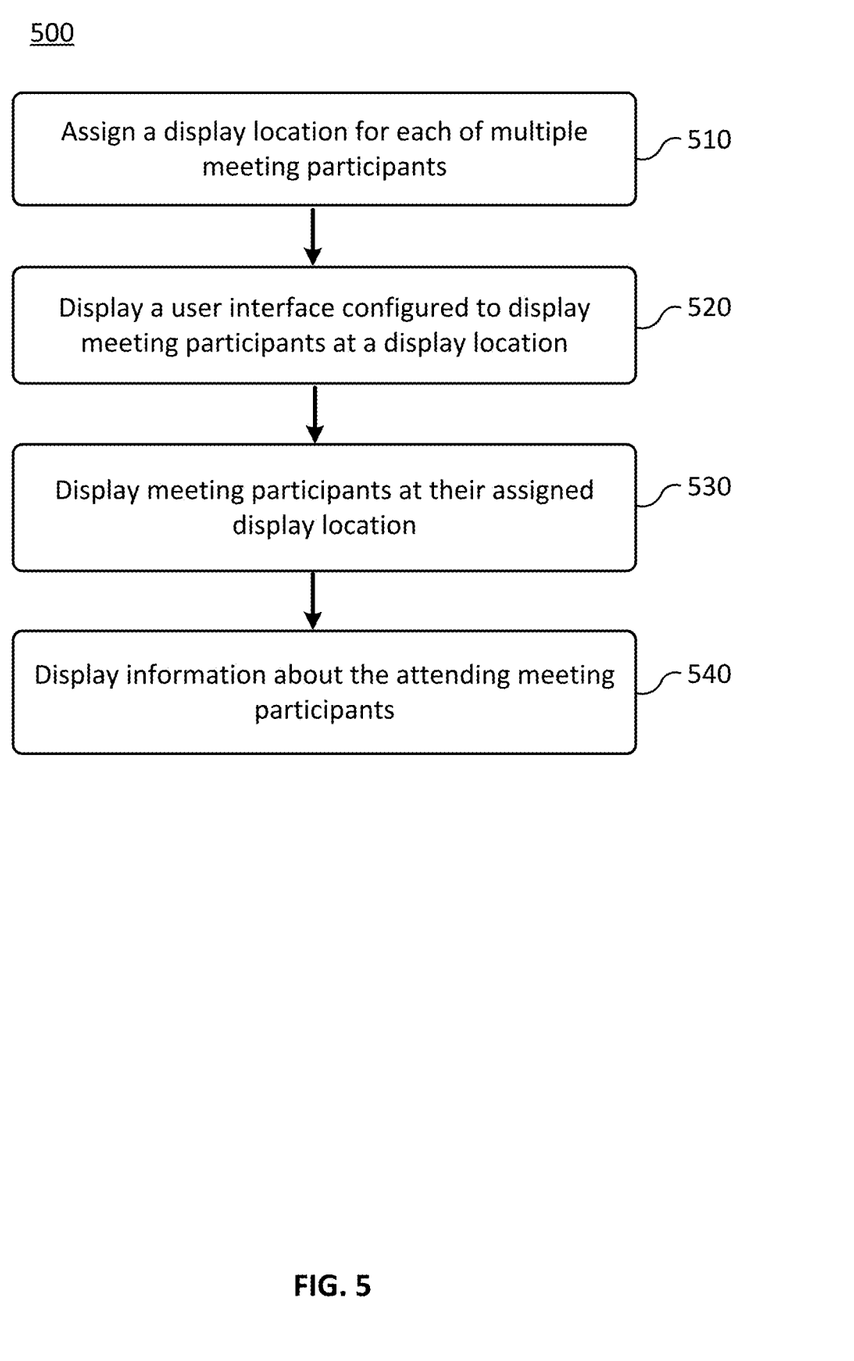
FIG. 5 is a flow chart illustrating an exemplary method that may be performed in some embodiments.

FIG. 5 is a flow chart illustrating an exemplary method 500 that may be performed in some embodiments. As discussed previously, the system provides for the assignment of a fixed or permanent display location or position for multiple attendees for a series of meetings, such as an online course attended by multiple students.

In step 510, the system assigns a display location for each of multiple meeting participants. The assignment of a display location for a meeting participant may be done automatically using a list of the meeting participants and/or via a configuration user interface allowing a primary user (such as an admin or instructor user) to assign, move, delete and/or add meeting participants to a specified display location.

In step 520, the system displays a user interface configured to display meeting participants at a display location. The user interface is displayed to a primary user (such as an admin user or instructor user). The user interface may have predetermined display locations or areas where information about each of the multiple meeting participants may be displayed. For example, the display locations or areas may display video, an image, an avatar or other information associated with a particular meeting participant. The user interface may be displayed via a display of a client device of the primary user.

In step 530, the system displays meeting participants at their assigned display location. For each of a series of meetings (such as an online course), the multiple meeting participants are displayed at their assigned display location. For example, in a first meeting the meeting participants are displayed at a display location of the user interface to the primary user. In subsequent online meetings, the meeting participants are displayed at the same display location as the previous meeting. The primary user may reorganize the display locations of the meeting participants such that in subsequent meetings the meeting participants would be displayed in their revised display location.

In step 540, the system displays information about the attending meeting participants. In the user interface displayed to the primary user, information relating to each particular meeting participant may be displayed in or about the display location. For example, in the context of an online course information about a particular student may be displayed. By way of illustration, but not limitation, information that may be displayed include one or more of the following information: student name, the student id, the student's course grade point average, the number of days the student has been absent, information whether the student has joined the meeting, a team or group that the student has been assigned to.

Figure 6:
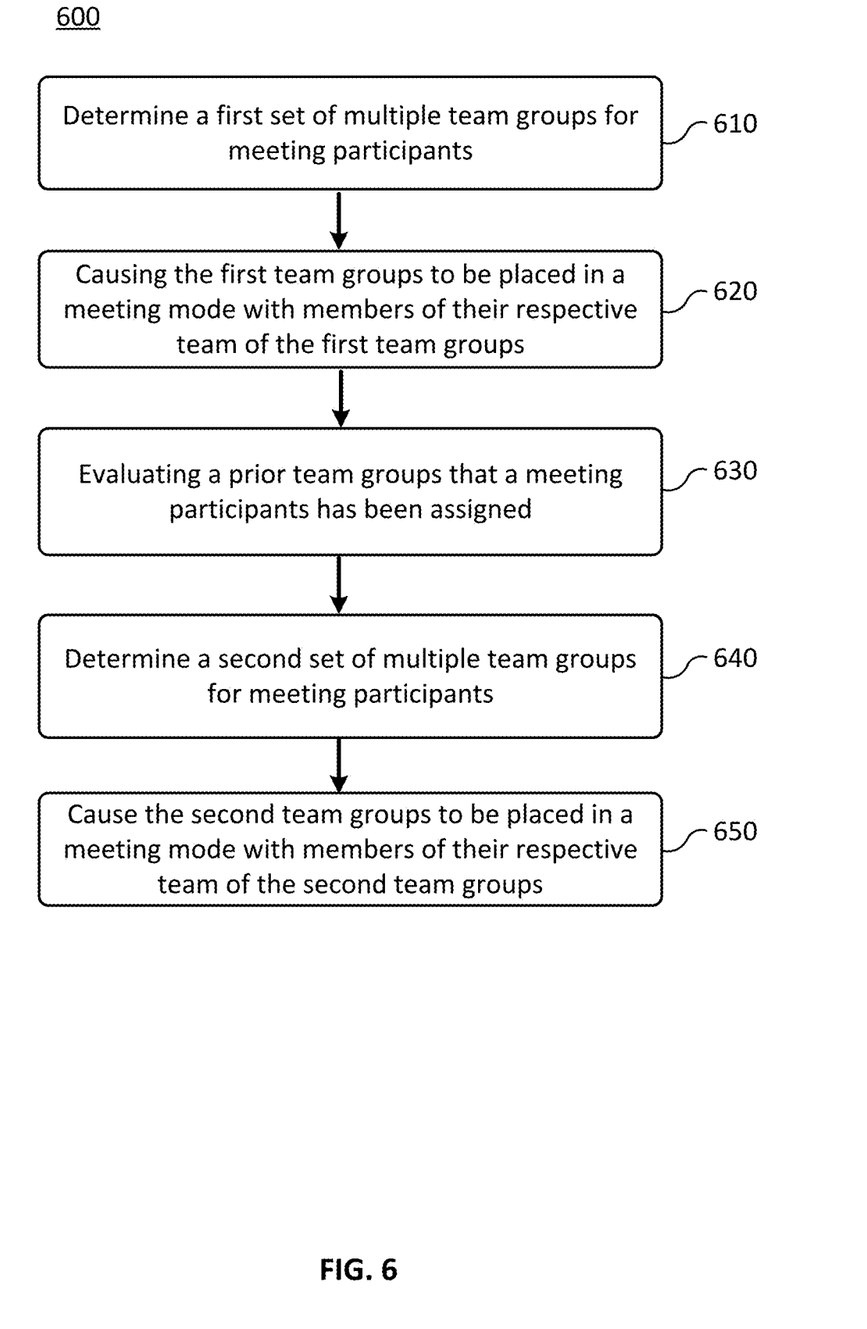
FIG. 6 is a flow chart illustrating an exemplary method that may be performed in some embodiments.

FIG. 6 is a flow chart illustrating an exemplary method 600 that may be performed in some embodiments. As discussed previously, the system provides for the assignment of meeting participants to particular teams or groups. The system may cause the respective members of the group to enter into a communication mode with the other members of the group (such as a virtual break out room) to communicate directly with those members of the group and with the instructor.

In step 610, the system determines a first set of multiple team groups for meeting participants. For example, each of the meeting participants may be automatically assigned to a first team and/or may be assigned to a team via a primary user. In the context of teaching an online course, an instructor is able to group students into smaller groups allowing group discussion among the team members of the first team groups.

In step 620, the system causes the first team groups to be placed in a meeting mode with members of their respective team of the first team groups. For example, based on an input to a user interface of the primary user, the system may cause each of the multiple meeting participants to be placed in a communications session directly with other members of their team.

In step 630, the system evaluates prior team groups that the meeting participants have been previously assigned to. Ideally, during a series of online courses with students changing the groups of which a student is assigned promotes communication and discussion with different students. The system stores information about each of the groups that the meeting participants has been assigned to. The system may then determine which students that a particular student has not worked with in a team group.

In step 640, the system determines a second set of multiple team groups for meeting participants. The system may automatically determine new team groups where the student team members have been assigned to a new group with those students that they have not been assigned to in the same group. The system may evaluate the primary group assignments and generate new group assignments reassigning the meeting participants to the new groups.

In step 650, the system causes the first team groups to be placed in a meeting mode with members of their respective team of the second team groups. For example, based on an input to a user interface of the primary user, the system may cause each of the multiple meeting participants to be placed in a communications session directly with other members of their team for the second team groups.

Over the course of several online meetings, the system may automatically reassign multiple meeting participants to different groups. Moreover, the primary user may reassign or create curated groups of users to place certain meeting participants into certain groups.

Additionally, the system may store in a data repository and access information related to a student's college, major, minor, department, college year, interests, hobbies, home town, etc. The foregoing information and other information may be used for grouping students in respective teams based on common information among the students. Especially, at the beginning of an online series of classes, grouping students based on common information may promote an opportunity for the students to bond and relate to each other in an assigned group based on their common information or experiences. Moreover, the information may be displayed via the user interface 200 and user interface 400 and may be displayed proximate to the student's assigned display location.

Figure 7:
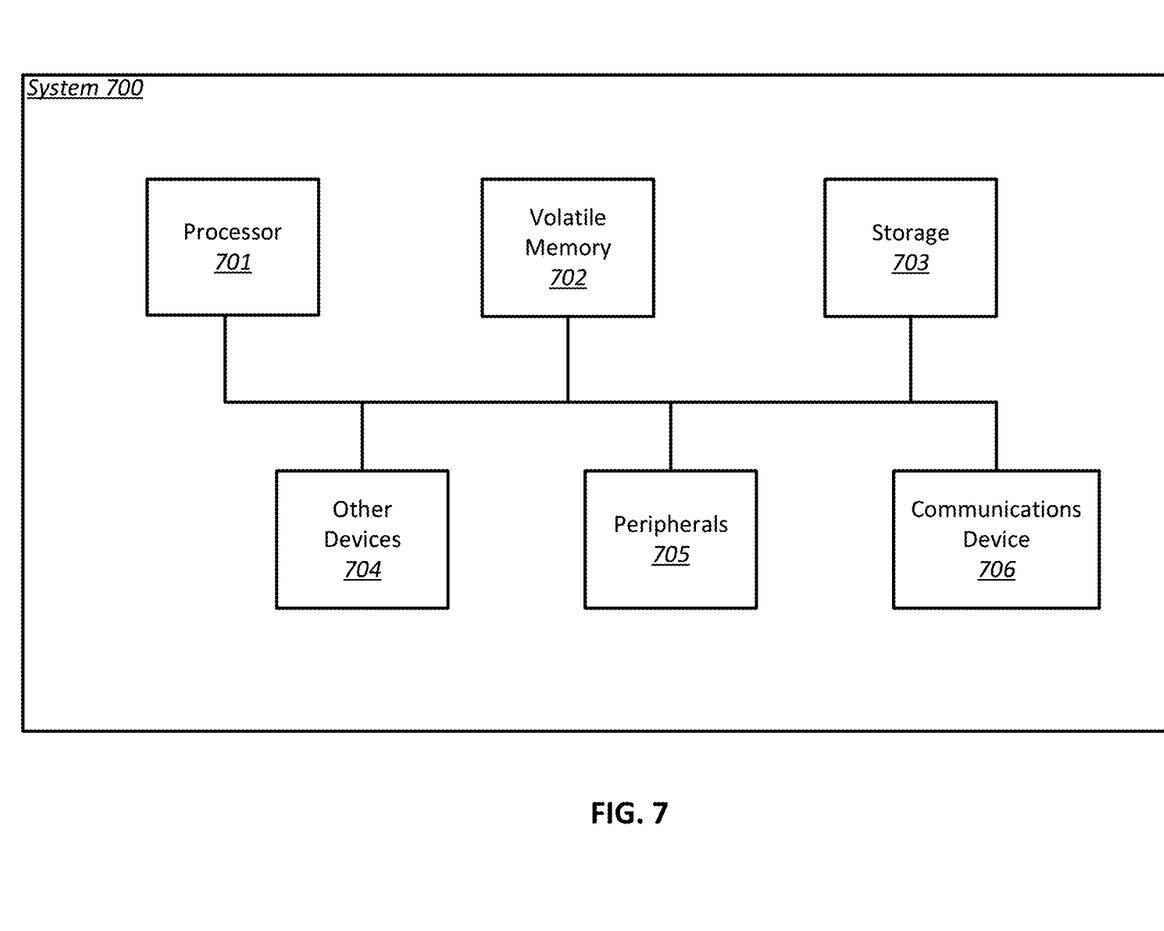
FIG. 7 is a diagram illustrating an exemplary computer that may perform processing in some embodiments.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 701.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-R and DVD-R recorders/players. Communications device 706 may connect the computer 700 to an external medium. For example, communications device 706 may take the form of a network adapter that provides communications to a network. A computer 700 may also include a variety of other devices 704. The various components of the computer 700 may be connected by a connection medium such as a bus, crossbar, or network.

It will be appreciated that the present disclosure may include any one and up to all of the following examples.

Example 1: A computer-implemented method comprising: assigning a display location for each of multiple meeting participants, the display location being associated with an identifier of a meeting participant; providing for display a user interface configured to display meeting participants at display locations; and after a particular meeting participant has joined a first video conferencing session, providing for display the particular meeting participant at their assigned display location.

Example 2: The computer-implemented method Example 1, further comprising: recording meeting attendance for each of the multiple meeting participants; and displaying, via the user interface, meeting attendance information for the respective multiple meeting participants about the assigned display location.

Example 3: The computer-implemented method of any one of Examples 1-2, the assigning a display location further comprising: automatically assigning a display location to a meeting participant based on the sequence of when the meeting participant joins a first meeting.

Example 4: The computer-implemented method of any one of Examples 1-3, the assigning a display location further comprising: receiving an electronic listing of meeting participants with an associated display location; and automatically assigning a display location to a meeting participant based on the received electronic listing.

Example 5: The computer-implemented method of any one of Examples 1-4, the assigning a display location further comprising: receiving an input, via the user interface, about a display location, information describing a unique identifier for a meeting participant, wherein the unique identifier associates the meeting participant to the display location.

Example 6: The computer-implemented method of any one of Examples 1-5, further comprising: assigning a first set of multiple meeting participants to a first group; assigning a second set of multiple meeting participants to a second group; receiving an input via the user interface; in response to receiving the input: causing each of the multiple meeting participants of the first group to enter a video conferencing mode with the multiple meeting participants of the first group; and causing each of the multiple meeting participants of the second group to enter a video conferencing mode with the multiple meeting participants of the second group.

Example 7: The computer-implemented method of any one of Examples 1-6, further comprising: after the particular meeting participant has joined a second video conferencing session, providing for display the particular meeting participant at their assigned display location.

Example 8: A non-transitory computer readable medium that stores executable program instructions that when executed by one or more computing devices configure the one or more computing devices to perform operations comprising: assigning a display location for each of multiple meeting participants, the display location being associated with an identifier of a meeting participant; providing for display a user interface configured to display meeting participants at display locations; and after a particular meeting participant has joined a first video conferencing session, providing for display the particular meeting participant at their assigned display location.

Example 9: The non-transitory computer readable medium of Example 8, further comprising: recording meeting attendance for each of the multiple meeting participants; and displaying, via the user interface, meeting attendance information for the respective multiple meeting participants about the assigned display location.

Example 10: The non-transitory computer readable medium of any one of Examples 8-9, the assigning a display location further comprising: automatically assigning a display location to a meeting participant based on the sequence of when the meeting participant joins a first meeting.

Example 11: The non-transitory computer readable medium of any one of Examples 8-10, the assigning a display location further comprising: receiving an electronic listing of meeting participants with an associated display location; and automatically assigning a display location to a meeting participant based on the received electronic listing.

Example 12: The non-transitory computer readable medium any one of Examples 8-11, the assigning a display location further comprising: receiving an input, via the user interface, about a display location, information describing a unique identifier for a meeting participant, wherein the unique identifier associates the meeting participant to the display location.

Example 13: The non-transitory computer readable medium of any one of Examples 8-12, further comprising the operations of: assigning a first set of multiple meeting participants to a first group; assigning a second set of multiple meeting participants to a second group; receiving an input via the user interface; in response to receiving the input: causing each of the multiple meeting participants of the first group to enter a video conferencing mode with the multiple meeting participants of the first group; and causing each of the multiple meeting participants of the second group to enter a video conferencing mode with the multiple meeting participants of the second group.

Example 14: The non-transitory computer readable medium of any one of Examples 8-13, further comprising the operations of: after the particular meeting participant has joined a second video conferencing session, providing for display the particular meeting participant at their assigned display location.

Example 15: A system comprising one or more processors configured to perform the operations of: assigning a display location for each of multiple meeting participants, the display location being associated with an identifier of a meeting participant; providing for display a user interface configured to display meeting participants at display locations; and after a particular meeting participant has joined a first video conferencing session, providing for display the particular meeting participant at their assigned display location.

Example 16: The system of Example 15, further comprising the operations of: recording meeting attendance for each of the multiple meeting participants; and displaying, via the user interface, meeting attendance information for the respective multiple meeting participants about the assigned display location.

Example 17: The system of any one of Examples 15-16, the assigning a display location further comprising: automatically assigning a display location to a meeting participant based on the sequence of when the meeting participant joins a first meeting.

Example 18: The system of any one of Examples 15-17, the assigning a display location further comprising: receiving an electronic listing of meeting participants with an associated display location; and automatically assigning a display location to a meeting participant based on the received electronic listing.

Example 19: The system of any one of Examples 15-18, the assigning a display location further comprising: receiving an input, via the user interface, about a display location, information describing a unique identifier for a meeting participant, wherein the unique identifier associates the meeting participant to the display location.

Example 20: The system of any one of Examples 15-19, further comprising the operations of: assigning a first set of multiple meeting participants to a first group; assigning a second set of multiple meeting participants to a second group; receiving an input via the user interface; in response to receiving the input: causing each of the multiple meeting participants of the first group to enter a video conferencing mode with the multiple meeting participants of the first group; and causing each of the multiple meeting participants of the second group to enter a video conferencing mode with the multiple meeting participants of the second group.

Example 21: The system of any one of Examples 15-20, further comprising: after the particular meeting participant has joined a second video conferencing session, providing for display the particular meeting participant at their assigned display location.

Some portions of the preceding detailed descriptions have been presented in terms of algorithms, equations and/or symbolic representations of operations on data bits within a computer memory. These algorithmic and/or equation descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
    assigning, prior to a first scheduled meeting of a series of video conferencing sessions, a display location for each of multiple meeting participants for the series of video conferencing sessions, the display location being fixed for the series of video conferencing sessions; and
    providing a user interface configured to display meeting participants of the multiple meeting participants at their assigned display locations for a video conferencing session of the series of video conferencing sessions.

2. The method of claim 1, further comprising:
    recording meeting attendance for each of the multiple meeting participants; and
    displaying, via the user interface, the meeting attendance for each of the multiple meeting participants.

3. The method of claim 1, wherein assigning a display location comprises:
    automatically assigning display locations to each meeting participant of the multiple meeting participants based on when each meeting participant joins a first video conferencing session.

4. The method of claim 1, wherein assigning a display location comprises:
    receiving an electronic listing of the multiple meeting participants; and
    automatically assigning display locations to each of the multiple meeting participants based on the received electronic listing.

5. The method of claim 1, wherein assigning a display location comprises:
    receiving, via the user interface, information describing a unique identifier for a meeting participant of the multiple meeting participants, wherein the unique identifier is used to select the assigned display location for the meeting participant.

6. The method of claim 1, further comprising:
    forming a first group of meeting participants of the multiple meeting participants;
    forming a second group of meeting participants of the multiple meeting participants;
    causing each of the meeting participants of the first group to enter a first video conferencing break out room during the video conferencing session; and
    causing each of the meeting participants of the second group to enter a second video conferencing break out room during the video conferencing session.

7. The method of claim 1, further comprising:
    displaying, via the user interface, a meeting participant of the multiple meeting participants at their assigned display location for a subsequent video conferencing session that the meeting participant has joined.

8. A non-transitory computer readable medium that stores executable program instructions that when executed by one or more computing devices configure the one or more computing devices to perform operations comprising:
    assigning, prior to a first scheduled meeting of a series of video conferencing sessions, a display location for each of multiple meeting participants for the series of video conferencing sessions, the display location being fixed for the series of video conferencing sessions; and
    providing a user interface configured to display meeting participants of the multiple meeting participants at their assigned display locations for a video conferencing session of the series of video conferencing sessions.

9. The non-transitory computer readable medium of claim 8, the operations further comprising:
    recording meeting attendance for each of the multiple meeting participants; and
    displaying, via the user interface, the meeting attendance for each of the multiple meeting participants.

10. The non-transitory computer readable medium of claim 8, wherein assigning a display location comprises:
    automatically assigning display locations to each meeting participant of the multiple meeting participants based on when each meeting participant joins a first video conferencing session.

11. The non-transitory computer readable medium of claim 8, wherein assigning a display location comprises:
    receiving an electronic listing of the multiple meeting participants; and
    automatically assigning display locations to each of the multiple meeting participants based on the received electronic listing.

12. The non-transitory computer readable medium of claim 8, wherein assigning a display location comprises:
    receiving, via the user interface, information describing a unique identifier for a meeting participant of the multiple meeting participants, wherein the unique identifier is used to select the assigned display location for the meeting participant.

13. The non-transitory computer readable medium of claim 8, the operations further comprising:

forming a first group of meeting participants of the multiple meeting participants;

forming a second group of meeting participants of the multiple meeting participants;

causing each of the meeting participants of the first group to enter a first video conferencing break out room during the video conferencing session; and causing each of the meeting participants of the second group to enter a second video conferencing break out room during the video conferencing session.

14. The non-transitory computer readable medium of claim 8, the operations further comprising:

displaying, via the user interface, a meeting participant of the multiple meeting participants at their assigned display location for a subsequent video conferencing session that the meeting participant has joined.

15. An apparatus comprising:

a memory; and a processor configured to execute instructions stored in the memory to:

assign, prior to a first scheduled meeting of a series of video conferencing sessions, a display location for each of multiple meeting participants for the series of video conferencing sessions, the display location being fixed for the series of video conferencing sessions; and provide a user interface configured to display meeting participants of the multiple meeting participants at their assigned display locations for a video conferencing session of the series of video conferencing sessions.

16. The apparatus of claim 15, wherein the processor is further configured to execute instructions stored in the memory to:

record meeting attendance for each of the multiple meeting participants; and display, via the user interface, the meeting attendance for each of the multiple meeting participants.

17. The apparatus of claim 15, wherein assigning a display location comprises:

automatically assigning display locations to each meeting participant of the multiple meeting participants based on when each meeting participant joins a first video conferencing session.

18. The apparatus of claim 15, wherein assigning a display location comprises:

receiving an electronic listing of the multiple meeting participants; and automatically assigning display locations to each of the multiple meeting participants based on the received electronic listing.

19. The apparatus of claim 15, wherein assigning a display location comprises:

receiving, via the user interface, information describing a unique identifier for a meeting participant of the multiple meeting participants, wherein the unique identifier is used to select the assigned display location for the meeting participant.

20. The apparatus of claim 15, wherein the processor is further configured to execute instructions stored in the memory to:

form a first group of meeting participants of the multiple meeting participants;

form a second group of meeting participants of the multiple meeting participants;

cause each of the meeting participants of the first group to enter a first video conferencing break out room during the video conferencing session; and cause each of the meeting participants of the second group to enter a second video conferencing break out room during the video conferencing session.

\* \* \* \* \*